United States Patent
Cheng et al.

(10) Patent No.: US 6,396,609 B1
(45) Date of Patent: May 28, 2002

(54) DISPERSION COMPENSATION FOR OPTICAL SYSTEMS

(75) Inventors: Chi-Hao Cheng, Dallas; Jian-Yu Liu, Garland; Kuang-Yi Wu; Charles Wong, both of Plano, all of TX (US)

(73) Assignee: Chorum Technologies, LP, Richardson, TX (US)

( * ) Notice: Subject to any disclaimer, the term of this patent is extended or adjusted under 35 U.S.C. 154(b) by 0 days.

(21) Appl. No.: 09/469,336

(22) Filed: Dec. 20, 1999

(51) Int. Cl.[7] .................. H04B 10/00; H04B 10/12; H04J 14/06
(52) U.S. Cl. .................. 359/161; 359/117; 359/122; 359/156; 359/138
(58) Field of Search ................ 359/161, 117, 359/122, 127, 173

(56) References Cited

U.S. PATENT DOCUMENTS

| | | | |
|---|---|---|---|
| 3,501,640 A | 3/1970 | Harris | 250/199 |
| 4,019,807 A | 4/1977 | Boswell et al. | 350/160 |
| 4,039,252 A | 8/1977 | Mizuno et al. | 350/160 |
| 4,378,955 A | 4/1983 | Bleha, Jr. et al. | 350/334 |
| 4,461,543 A | 7/1984 | McMahon | 350/383 |
| 4,516,837 A | 5/1985 | Soref | 350/347 |
| 4,566,761 A | 1/1986 | Carlsen et al. | 350/401 |
| 4,685,773 A | 8/1987 | Carlsen et al. | 350/401 |
| 4,737,003 A | 4/1988 | Matsumura et al. | 350/96.14 |
| 4,893,931 A | 1/1990 | Lefevre et al. | 356/351 |
| 4,896,947 A | 1/1990 | Leenhouts | 350/337 |
| 4,952,030 A | 8/1990 | Nakagawa et al. | 350/337 |
| 4,999,619 A | 3/1991 | Te Velde | 340/784 |
| 5,105,289 A | 4/1992 | Sonehara et al. | 359/70 |
| 5,185,824 A | 2/1993 | Grimes et al. | 385/19 |
| 5,477,350 A | 12/1995 | Riza et at. | 359/39 |
| 5,555,113 A | 9/1996 | Mulkens et al. | 359/63 |
| 5,596,661 A | 1/1997 | Henry et al. | 385/24 |

(List continued on next page.)

FOREIGN PATENT DOCUMENTS

| | | |
|---|---|---|
| EP | 0 905 936 A2 | 3/1999 |
| WO | WO 98/47254 | 10/1998 |
| WO | WO 99/28778 | 6/1999 |
| WO | WO 99/45738 | 9/1999 |
| WO | WO 99/49605 | 9/1999 |

OTHER PUBLICATIONS

Inoue et al., "A Four–Channel Optical Waveguide Multi/Demultiplexer for 5–Ghz Spaced Optical FDM Transmission", *Journal of Lightwave Technology*, 6:2(1998)339–345.

Madsen et al., "A General Planar Waveguide Autoregressive Optical Filter", *Journal of Lightwave Technology*, 14:3 (1996) 437–447.

(List continued on next page.)

*Primary Examiner*—Jason Chan
*Assistant Examiner*—M. R. Sedighian
(74) *Attorney, Agent, or Firm*—Baker Botts L.L.P.

(57) ABSTRACT

A stacked waveplate device that performs an optical wavelength filtering function is described which provides dispersion with a first magnitude and a first sign for a first optical path having a first output polarization and which provides a second dispersion with a substantially equal but oppositely-signed dispersion for a second optical path defining an output having an orthogonal polarization to the polarization of said first output path. Optical paths are configured to pass through first and second stacked waveplate devices sequentially with the optical dispersion of said second device having an approximately equal magnitude but opposite sign compared to the optical dispersion of the first optical stacked waveplate devices so as to provide canceling or compensation of optical dispersion. A device is configured to use cancellation or compensation of dispersion in sequential stacked waveplate devices to provide outputs with characteristics similar to outputs of previous stacked waveplate devices but with substantially reduced dispersion characteristics.

76 Claims, 6 Drawing Sheets

U.S. PATENT DOCUMENTS

| | | | |
|---|---|---|---|
| 5,608,652 A | 3/1997 | Astle | 364/514 |
| 5,623,360 A | 4/1997 | Gesell et al. | 359/287 |
| 5,680,490 A | 10/1997 | Cohen et al. | 385/24 |
| 5,694,233 A * | 12/1997 | Wu et al. | 359/117 |
| 5,712,704 A | 1/1998 | Martin et al. | 356/351 |
| 5,724,165 A | 3/1998 | Wu | 359/117 |
| 5,726,723 A | 3/1998 | Wang et al. | 349/75 |
| 5,740,288 A | 4/1998 | Pan | 385/11 |
| 5,809,190 A | 9/1998 | Chen | 385/43 |
| 5,854,666 A | 12/1998 | Fujimaki | 349/180 |
| 5,867,291 A | 2/1999 | Wu et al. | 359/124 |
| 5,870,164 A | 2/1999 | Lu et al. | 349/180 |
| 5,877,876 A | 3/1999 | Birdwell | 359/39 |
| 5,883,687 A | 3/1999 | Lu et al. | 349/201 |
| 5,912,748 A * | 6/1999 | Wu et al. | 359/117 |
| 5,933,207 A | 8/1999 | Wu | 349/99 |
| 5,936,697 A | 8/1999 | Yang | 349/180 |
| 5,943,151 A * | 8/1999 | Grasso et al. | 359/161 |
| 5,946,116 A | 8/1999 | Wu et al. | 359/117 |
| 5,963,291 A | 10/1999 | Wu et al. | 349/196 |
| 5,978,116 A | 11/1999 | Wu et al. | 359/124 |
| 6,005,697 A | 12/1999 | Wu et al. | 359/117 |
| 6,067,178 A | 5/2000 | Zheng | 359/124 |
| 6,094,246 A | 7/2000 | Wong et al. | 349/99 |
| 6,097,451 A | 8/2000 | Palmer et al. | 349/14 |
| 6,111,625 A | 8/2000 | Ohta et al. | 349/141 |
| 6,130,971 A | 10/2000 | Cao | 385/31 |
| 6,134,358 A | 10/2000 | Wu et al. | 385/16 |
| 6,137,604 A | 10/2000 | Bergano | 359/124 |
| 6,137,606 A | 10/2000 | Wu et al. | 359/124 |
| 6,141,076 A | 10/2000 | Liu et al. | 349/134 |
| 6,144,494 A | 11/2000 | Shirasaki et al. | 359/578 |
| 6,151,158 A * | 11/2000 | Takeda et al. | 359/341 |
| 6,166,838 A | 12/2000 | Liu et al. | 359/128 |
| 6,169,604 B1 | 1/2001 | Cao | 356/519 |
| 6,175,432 B1 | 1/2001 | Wu et al. | 359/124 |
| 6,201,593 B1 | 3/2001 | Wong et al. | 349/180 |
| 6,208,442 B1 | 3/2001 | Liu et al. | 359/127 |
| 6,212,313 B1 | 4/2001 | Li | 385/24 |

OTHER PUBLICATIONS

C.K. Madsen, "A Multiport Frequency Band Selector with Inherently Low Loss, Flat Passbands, and Low Crosstalk", *IEEE Phontonics Technology Letters*, 10:12 (1998) 1766–1768.

Chung et al., "Analysis of a Tunable Multichannel Two–Mode–Interference Wavelength Division Multiplexer/Demultiplexer", *Journal of Lightwave Technology*, 7:5 (1989) 766–777.

Liu et al., "Digitally Programmable Wavelength–Switching Technology", IEEE/LEDS Summer Topical Meetings Aug. 1997, 9–10.

Madsen, "Efficient Architectures for Exactly Realizing Optical Filters with Optimum Bandpass Designs", *IEEE Photonics Technology Letters*, 10:8 (1998) 1136–1138.

Dingel et al., "Multifunction optical filter with a Michelson–Gires–Tournois interferometer for wavelength–division–multiplexed network system applications", *Optics Letters*, 23:14 (1998) 1099–1101.

Madsen et al., "Optical All–Pass Filters for Phase Response Design with Applications for Dispersion Compensation", *IEEE Photonics Technology Letters*, 10:7 (1998) 994–996.

Nosu et al., "Optical FDM Transmission Technique", *Journal of Lightwave Technology*, LT–5:9 (1987) 1301–1308.

Dingel et al., "Optical wave–front transformer using the multiple–reflection interference effect inside a resonator", *Optics Letters*, 22:9 (1997) 1449–1451.

Dingel et al., "Properties of a Novel Noncascaded Type, Easy–to–Design, Ripple–Free Optical Bandpass Filter", *Journal of Lightwave Technology*, 17:8 (1999) 1461–1469.

Peng et al., "Optical implementation of regular rectangular CC–banyon network by using polarizing beam splitters", *Optics Communications*, 117: (1995) 37–42.

Lenz et al., "Dispersive Properties of Optical Filters for WDM Systems", *IEEE Journal of Quantum Electronics*, 34:8 (1998) 1390–1402.

Noguchi et al., "A Rearrangeable Multichannel Free–Space Optical Switch Based on Multistage Network Configuration", *Journal of Lightwave Technology*, 9:12 (1991) 1726–1732.

Kuroyanagi et al., "Optical Cross–Connect Architecture Using Free–Space Optical Switches Based on PI–LOSS Topology", *Fujitsu Laboratories Ltd.*, (1995) 2112–2117.

Agrawal, "Fiber–Optic Communication Systems; Dispersion Compensation (Chapter 9)", *The Institute of Optics*, 425–467.

Carlsen et al.; "Flat Passband Birefringent Wavelength–Division Multiplexers"; Electronic Letters, vol. 23, 1987; pp. 106–107.

Fujii et al.; "Wavelength–Division Multi/Demultiplexer Utilizing Optically Active Crystals"; Journal of Lightwave Technology, vol. 8, No. 7, Jul. 1990; pp. 1051–1054.

Ishio et al.; "Review and Status of Wavelength–Division–Multiplexing Technology and Its Application"; Journal of Lightwave Technology; vol. LT–2, No. 4, Aug. 1984; pp. 448–463.

Mahlein; "Fiber–Optic Communication in the Wavelength–Division Multiplex Mode"; Fiber and Integrated Optics, vol. 4, No. 4, Jun. 1982; pp. 339–372.

Melman et al.; "Tunable Birefringent Wavelength–Division Multiplexer/Demultiplexer"; Electronic Letters; vol. 21, 1985; pp. 634–635.

Senior et al.; "Devices for Wavelength Multiplexing and Demultiplexing"; IEEE Proceedings, vol. 136, Pt. J, No. 3, Jun. 1989; pp. 183–202.

Internet DCG ITU Dispersion Compensating Fiber Gratings; 1 page.

Internet TIGRA Tunable Dispersion Equalization Module; 2 pages.

* cited by examiner

DISPERSION COMPENSATION FOR OPTICAL SYSTEMS

The present invention relates to a method and apparatus for compensating chromatic dispersion and, in particular, a method and apparatus introducing positive and negative dispersion in a fashion to cancel out total dispersion in wavelength selective optical devices.

BACKGROUND INFORMATION

Systems which use optical components, exclusively or partially, for communicating information (typically digitally), switching, routing, transmitting and the like, generally provide certain advantages over, e.g. fully-electronic networks (e.g. providing typically higher data rates, requiring less physical space, less susceptibility to electromagnetic interference, and the like) but also present their own set of issues. These issues include signal loss and signal dispersion, each of which can occur either during transmission along optical fiber cables (or other transmission lines) or in discrete equipment or components such as optical routers, switches, hubs, bridges, multiplexers and the like. Certain types of components, such as erbium doped fiber amplifiers (EDFA) can provide sufficient amplification to overcome some or all transmission line losses, thus providing a system in which the limiting factor tends to be dispersion.

In general, dispersion refers to change or degradation of the wave shape of an optical signal, such as an (ideally) square-edged pulse. In general, the fact that different wavelengths have different effective rates of transmission along an optical transmission line and/or different indices of refraction and reflection can lead to pulse (or other signal) degradation, e.g. such that an original signal comprising a sequential plurality of square-edged pulses will, as a result of so called chromatic dispersion be changed such that each pulse, rather than retaining a substantially square-edged shape will have a more rounded, Gaussian shape. Dispersion can lead to, e.g. partial overlap between successive pulses resulting in signal detection problems such as high bit error rates, decrease in spectral efficiency or other problems, especially when combined with signal loss (amplitude reduction). Accordingly, it would be useful to provide a method and apparatus for use in optical systems, which can compensate for and/or reduce the amount of dispersion effect.

The dispersion problems become even more severe for wavelength division multiplexing (WDM) systems. The dense wavelength-division multiplexing (DWDM) scheme is widely adapted as one of the optimal solution to improve the bandwidth usage on optical fibers. By multiplexing multiple signals on different optical wavelengths, bandwidth of a single fiber can be multiple folded. Key optical components in DWDM systems include those which perform wavelength combining (multiplexing) and separating (demultiplexing) functions. The spectral response of the multiplexers and demultiplexers for DWDM applications are generally accompanied by certain dispersion effects that are determined by the underlying filtering technology. For example, the dispersion characteristic of a fiber Bragg grating can be determined by Hilbert transforming its transmission spectral response (e.g. as generally described in "Dispersion Properties of Optical Filters for WDM Systems" G. Lenz, B. J. Eggleton, C. R. Giles, C. K. Madsen, and R. E. Slusher, IEEE Journal of Quantum Electronics, Vol. 34, No 8 Page 1390–1402). The dispersion effects of wavelength multiplexing and filtering are very different from those of optical fibers. Optical fiber generally shows a linear dependency of its dispersion characteristic versus wavelength. Wavelength filters, multiplexers and demultiplexers, on the other hands, generally show nonlinear dispersion properties, e.g. correlated to its amplitude (spectral) response within its passband window. Although the accumulated dispersion due to fiber span can be compensated by different methods, such as dispersion compensating fibers or dispersion compensating fiber chirped gratings, dispersions caused by multiplexers/demultiplexers are difficult to compensate by conventional approaches. At least in narrow wavelength channel spacing DWDM systems that carry high data-rate information, it would be advantageous to provide dispersion filters, multiplexers, and demultiplexers that introduce minimum dispersion onto the signals.

SUMMARY OF THE INVENTION

The present invention includes a recognition of the existence, nature and/or source of certain problems in previous approaches, including as described herein. In one embodiment, the present invention involves the recognition that the chromatic dispersion occurring in a propagation path where polarization is intact or unchanged is substantially opposite to the dispersion along a similar propagation path but in which polarization is changed. According to one embodiment, the multi-stage or multi-component device is configured such that dispersion introduced at two different stacked waveplate filters along the optical path substantially cancel one another out, such as by introducing roughly equal amounts of positive and negative dispersion. In this context, dispersion values are approximately equal in magnitude if the difference in magnitude is sufficiently small that, upon combining oppositely-signed signals the resultant signal has a dispersion, in at least a first wavelength band of interest (such as a 90–95% transmission wavelength band) which is sufficiently low to achieve desired signal dispersion goals such as being less than about 10 ps, preferably less than 5 ps, more preferably less than about 3 ps and even more preferably less than about 2 ps. In one embodiment, chromatic dispersion which would otherwise be caused by stacked waveplate filters is (at least partially) canceled or compensated by the manner of arranging the optical signal propagation path.

A stacked waveplate device is described which provides dispersion with a first magnitude and a first sign for a first optical path having a first output polarization and which provides a second dispersion with a substantially equal but oppositely-signed dispersion for a second optical path defining an output having an orthogonal polarization to the polarization of said first output path. Optical paths are configured to pass through first and second stacked waveplate devices sequentially with the optical dispersion of said second device having an approximately equal magnitude but opposite sign compared to the optical dispersion of the first optical stacked waveplate device so as to provide canceling or compensation of optical dispersion. A device is configured to use cancellation or compensation of dispersion in sequential stacked waveplate devices to provide outputs with characteristics similar to outputs of previous stacked waveplate devices but with substantially reduced dispersion characteristics.

DETAILED DESCRIPTION OF THE INVENTION

Figure 1:
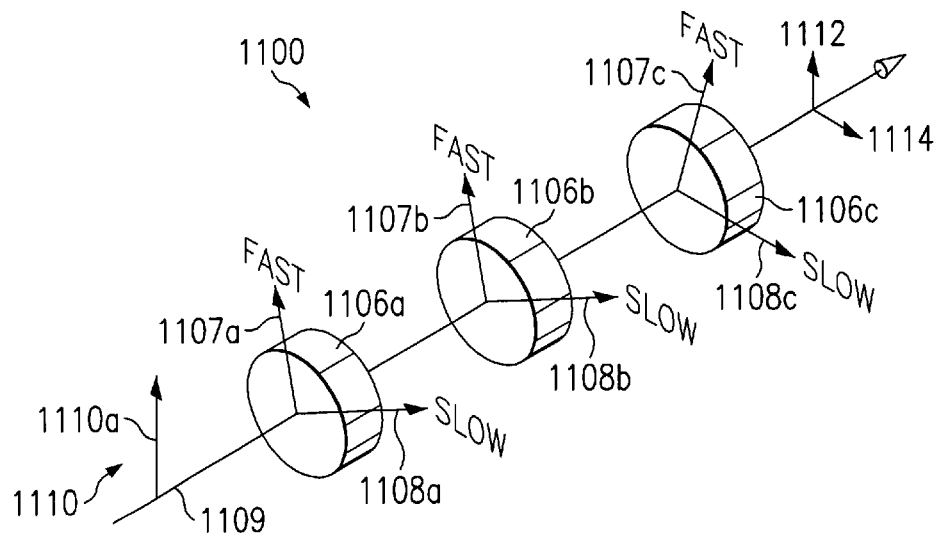
FIG. 1 is a simplified schematic diagram illustrating a stacked waveplate filter and an optical propagation path.
Figure 2:
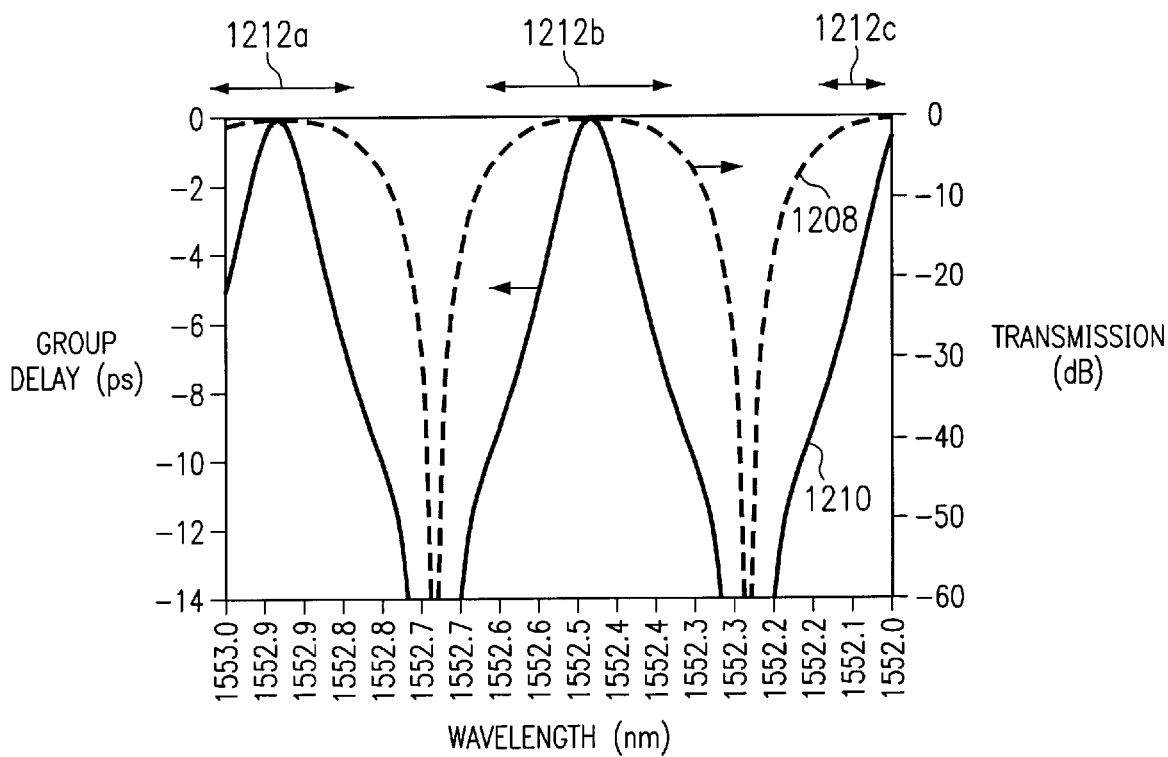
FIG. 2 is a graph illustrating simulated or modeled transmission and dispersion (group delay) characteristics of an optical propagation path with unchanged polarization.
Figure 3:
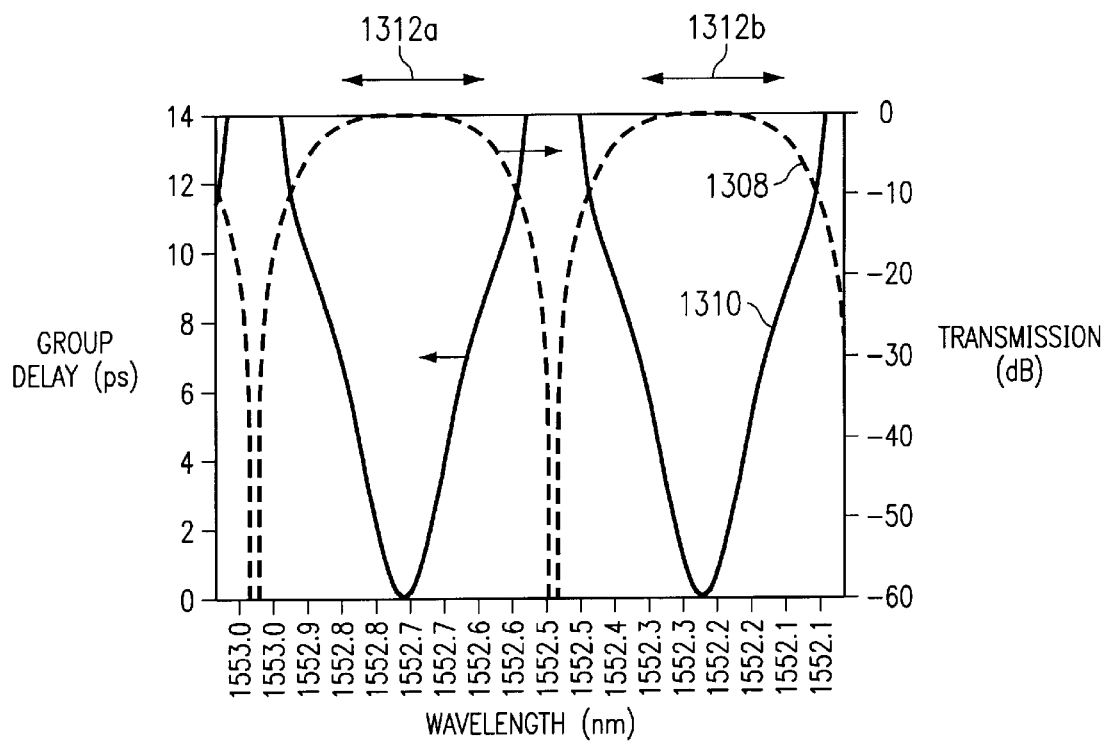
FIG. 3 is a graph illustrating simulated or modeled transmission and dispersion characteristics of an optical propagation path with changed polarization.

As depicted in FIG. 1, a stacked waveplate filter 1100 is made up of a plurality of substantially aligned individual waveplates 1106a, b, c. In one embodiment each waveplate is formed of a birefringent crystal, as will be understood by those of skill in the art. Fast and slow axes 1107a, b, c 1108a, b, c, for each waveplate, are illustrated. In the illustrated example, an optical propagation path 1109 passes successively through the waveplates 1106a, b, c. The input, 1110, which enters the first waveplate 1106a has, in this example, vertical polarization, denoted by a vertical arrow 1110a. After passing through the stacked waveplate filter 1100, the input signal, 1110, is decomposed into two components with different polarizations. One component, 1112, has vertical polarization represented by a vertical arrow, and the other component, 1114, has horizontal polarization, orthogonal to the first polarization, represented by a horizontal arrow. The configuration illustrated in FIG. 1 substantially provides two optical paths. The first optical path begins with the input 1110 having vertical polarization and output 1112 having vertical polarization (designated the Vertical-Vertical path). The second path has input 1110 with vertical polarization and output 1114 with horizontal polarization (designated the Vertical-Horizontal path). FIGS. 2 and 3 illustrate (modeled or simulated) transmission (1208) and group delay (1210) for the Vertical-Vertical path (FIG. 2) and for Vertical-Horizontal path (FIG. 3). FIGS. 2 and 3 illustrate that the stacked waveplate of FIG. 1 operates as a periodic optical filter, i.e. providing output defining a transmission curve which (as a function of wavelength) is periodic. Comparison of FIGS. 2 and 3 illustrates that chromatic dispersion characteristics within each transmission band (1212a, b, c for FIG. 2 and 1312a, b for FIG. 3) have substantially opposite shapes (i.e. have group delay peaks in the middle of transmission bands for FIG. 2 and have group delay troughs in the middle of the transmission bands for FIG. 3), i.e. that the periodicity of the two outputs from the stacked waveplates (respectively illustrated in FIGS. 2 and three) is complementary. In FIGS. 2 and 3, dispersion is expressed as group delay in units of picoseconds (ps). Dispersion is often characterized as picoseconds/km-nm. Transmission is shown in FIG. 3 and FIG. 2 as transmission loss ratio expressed in decibels (dB) (as a function of wavelength expressed in nanometers (nm)). One embodiment of the present invention involves the recognition of the opposite or inverted nature of the dispersion characteristics for these two different optical paths and/or a manner in which these features of the dispersion characteristics can be used to compensate the chromatic dispersion (i.e. to substantially reduce or eliminate chromatic dispersion) e.g. caused by a stacked waveplate filter.

Figure 4:
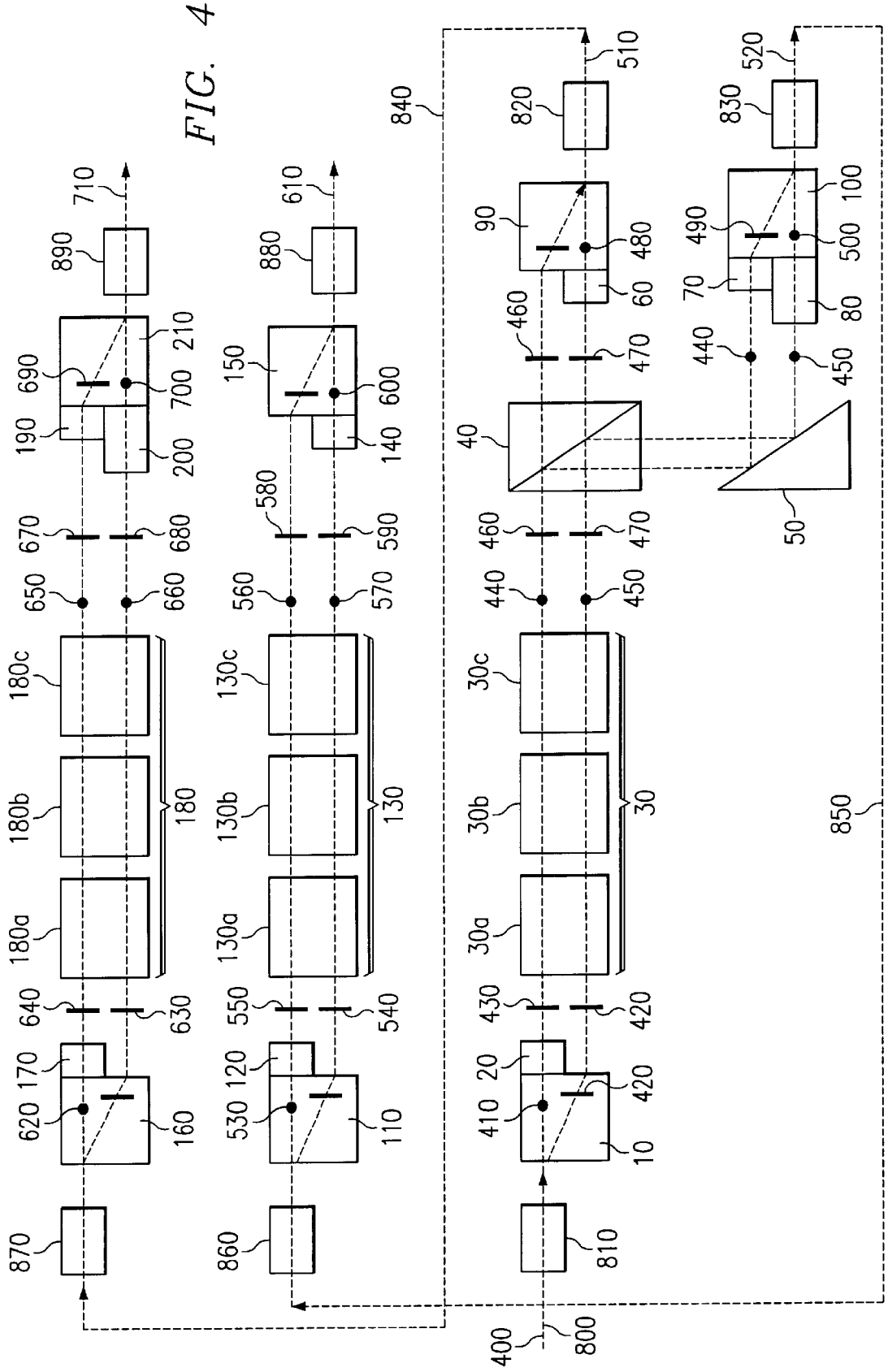
FIG. 4 is a simplified block diagram illustrating an optical system according to an embodiment of the present invention.

FIG. 4 illustrates a simplified diagram of a double stage stacked-waveplate optical system according to one embodiment of the present invention. Many double stage stacked-waveplate systems such as described in U.S. Pat. Nos. 5,694,233 and 5,912,748 (incorporated herein by reference) are used e.g. to generate more desirable spectra or to provide better performance. However, without careful arrangement of the optical paths of these double stage systems, the resulting chromatic dispersion might be significant. The system presented in FIG. 4 shows that, with present invention, the resulting chromatic dispersion can be significantly reduced or compensated.

In the optical system described in FIG. 4, an incoming signal 400 passes through an optical fiber 800 and a collimator 810 to enter the system. The input optical signal 400 is then decomposed by a beam displacer 10 into two components: signal 410 with horizontal polarization (represented in FIG. 4 by a dot) and signal 420 with vertical polarization (represented in FIG. 4 by a vertical line). After passing though the beam displacer 10, component 410 passes through a half-wave plate 20 so that its polarization is changed to vertical, the resulting signal being designated as 430. Although optical signals 430 and 420 have the same polarization, they are spatially separated. Optical signals 430 and 420 then pass through a stacked waveplate filter 30 made up of a plurality of substantially aligned individual waveplates 30a, 30b, and 30c. In one preferred embodiment, the stacked waveplate filter provides temperature compensation (reduces excursions from desired performance caused by changes in component temperature) such as by selecting two or more waveplates or waveplate components with thermal performance which cancel one another out, e.g. as described in U.S. patent application Ser. No. 09/020,706 titled Temperature Insensitive Polarization Filter, incorporated herein by reference.

As illustrated in FIG. 1, the output signals of stacked waveplate filter 30 (corresponding to incoming signals 430 and 420) are two sets of two signals with orthogonal polarizations. The output signals corresponding with signal 430 are signal 440 (with horizontal polarization) and signal 460 (with vertical polarization). The output signals corresponding to signal 420 are signal 450 (with horizontal polarization) and signal 470 (with vertical polarization). Two polarization beamsplitters 40 and 50 are then used to separate signals with different polarization. Signals with vertical polarization, 460 and 470 are separated from signals with horizontal polarization, 440 and 450 by these two polarization beamsplitters. Signals with the same polarization are spatially separated.

To combine two spatially separated signals with the same polarization together without energy loss, the polarization of one signal needs to be changed. Signal 470 with the vertical polarization passes through a half-waveplate 60, and its polarization is changed to horizontal. The resulting signal with horizontal polarization is designated as 480. Signals 460 and 480 pass through a beam displacer 90 and are combined into signal 510. The signal 510 is then passed through the collimator 820 into optical fiber 840 to enter the next stage of the system.

To combine signals 440 and 450 with horizontal polarization together, a similar technique is used. Signal 440 passes through a half-waveplate 70 so that its polarization is changed to vertical. The signal 450 is passed through a glass 80 so that the index difference between the optical paths of signals 440 and 450 can be compensated. Signal 440 goes through the optical path 10-20-30-40-50, and signal 450 goes through the optical path 10-30-40-50. There is an index difference between these two optical paths; therefore, the glass 80 is provided. It is generally desirable to make the effective optical path length of the signals 440, 450 substantially equal, as they reach the beam diverter 100. As can be seen from FIG. 4, the optical path of signal 440, as it arrives at beam diverter 100, includes passage through wave plates 20 and 70. The glass 80 has proper optical properties (length, index of refraction, and the like) to increase the optical path length of signal 450 to match the optical path length of signal 440. Similarly, glass 200 increases the path length of signal 660 to match the path length of signal 650, in view of the passage of signal 650 through waveplates 170 and 190, before reaching the beam diverter 210.

After passing through the half-waveplate 70 and glass 80, signals 440 and 450 become signal 490 (with vertical polarization) and signal 500 (with horizontal polarization). These two signals are then combined into signal 520 by the beam displacer 100. The signal 520 is then passed through the collimator 830 into optical fiber 850 to enter the next stage of the system.

Signal 510 is made up of signals 460 and 470 whose polarization is unchanged by the waveplate filter 30. On the other hand, signal 520 is made up of signals 440 and 450 whose polarization is changed by the waveplate filter 30. To compensate for the dispersion induced by waveplate 30, further manipulation is conducted.

After passing through collimator 820, optical fiber 840, and collimator 870, signal 510 is first decomposed into two signals with different polarization by beam displacer 160. After passing through beam displacer 160, the incoming signal 510 is decomposed into signal 620 (with horizontal polarization) and signal 630 (with vertical polarization). Signal 620 is then passed through the half-waveplate 170, and its polarization is changed to vertical. This resulting signal with vertical polarization is designated as 640. Although signal 640 and 630 have the same polarization, they are spatially separated. Signals 640 and 630 then pass through a stacked waveplate filter 180 made up of a plurality of substantially aligned individual waveplates 180*a*, 180*b*, and 180*c*. The output signals of stacked waveplate filter 180 corresponding with incoming signals 640 and 630 are two sets of two signals with different polarizations orthogonal to each other. The output signals corresponding with the input signal 640 are signal 650 (with horizontal polarization) and signal 670 (with vertical polarization). The output signals corresponding with the input signal 630 are signal 660 (with horizontal polarization) and signal 680 (with vertical polarization).

Since signal 510 is made up of signal 460 and 470 whose polarization is not changed by the waveplate filter 30, signals 650 and 660 whose polarization is changed by the waveplate filter 180 are desired. This way, the chromatic dispersion caused by stacked waveplate filters 30 and 180 can be compensated. To combine signals 650 and 660 (which have horizontal polarization and are spatially separated) without energy loss, the polarization of one of them needs to be changed. Signal 650 is passed through half-waveplate 190, and its polarization is then changed to vertical. The resulting signal is designated as 690. Since signal 650 goes through the optical path 160-170-180 and signal 660 goes through optical path 160-180, to compensate the index difference between these two paths, a glass 200 is used for signal 660. The signal 660 (with vertical polarization) passes through the glass 200 without polarization change, and the resulting signal is designated as 700. Signal 690 (with vertical polarization) and signal 700 (with horizontal polarization) are combined together in the beam displacer 210. The resulting signal is designated as 710. The signal 710 is then passed through collimator 890 to enter optical fiber, systems, or network.

Figure 5:
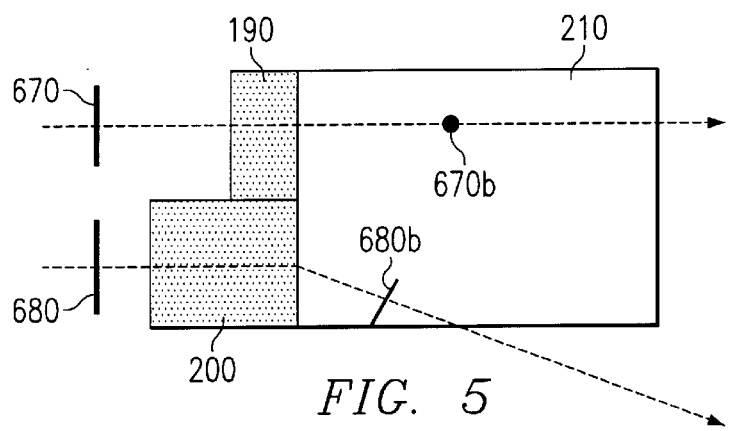
FIG. 5 is a partial block diagram illustrating the phenomenon that some undesirable optical signals will not interfere with the desired optical signals at the output of an optical system as illustrated in FIG. 4.

Signal 670 and 680 (with vertical polarization) will diverge after they pass through 190-210 and 200-210 respectively as illustrated in FIG. 5. The signal 670 (with vertical polarization) becomes signal 670*b* (with horizontal polarization) after it passes through the half-waveplate 190. As shown in FIG. 5, the signal 680 (with vertical polarization) becomes signal 680*b* (with vertical polarization) after it passes through the glass 200. As shown in FIGS. 4 and 5, the signals 670*b* and 680*b* will not converge with the signals 690 and 700 in the beam displacer 210; therefore, their effects are not taken into account here.

After passing through collimator 830 (FIG. 4), optical fiber 850, and collimator 860, signal 520 is first decomposed into two signals with different polarization by the beam displacer 110. After passing through the beam displacer 110, signal 520 is decomposed into signal 530 (with horizontal polarization) and signal 540 (with vertical polarization). Signal 530 is then passed through the half-waveplate 120, and its polarization is then changed to vertical. The resulting signal (with vertical polarization) is designated as 550. Although signals 540 and 550 have the same polarization, they are spatially separated. Signals 540 and 550 then pass through a stacked waveplate filter 130 made up of a plurality of substantially aligned individual waveplates 130*a*, 130*b*, and 130*c*. The output signals of stacked waveplate filter 130 corresponding with incoming signals 540 and 550 are two sets of two signals with different polarization orthogonal to each other. The output signals corresponding with signal 550 are signal 560 (with horizontal polarization) and signal 580 (with vertical polarization). The output signals corresponding with signal 540 are signal 570 (with horizontal polarization) and the signal 590 (with vertical polarization).

Since signal 520 is made up of signal 440 and 450 whose polarization is changed by the waveplate filter 30, signals 580 and 590 whose polarization is not changed by the waveplate filter 130 is desired. This way, the chromatic dispersion caused by stacked waveplate filters 30 and 130 can be compensated. To combine signals 580 and 590 (which have the vertical polarization and are spatially separated) without energy loss, the polarization of one of them needs to be changed. Signal 590 is passed through the half waveplate 140, and its polarization is then changed into horizontal. The resulting signal is designated as 600. Signal 580 (with vertical polarization) and signal 600 (with horizontal polarization) are then combined by the beam displacer 150 into signal 610. The signal 610 is then passed through collimator 880 to enter optical fiber, systems, or network.

Figure 6:
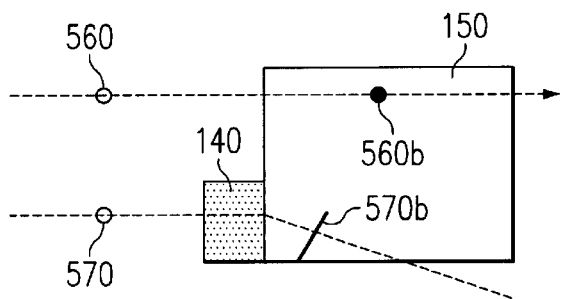
FIG. 6 is a partial block diagram illustrating the phenomenon that some undesirable optical signals will not interfere with the desired optical signals at the output of an optical system as illustrated in FIG. 4.

Signal 560 and 570 with horizontal polarization will diverge after they pass through 150 and 140-150 respectively as illustrated in FIG. 6. Signal 570 (with horizontal polarization) becomes signal 570b (with vertical polarization) after it passes through the half-waveplate 140. As shown in FIGS. 4 and 6, signals 560b and 570b will not converge with signals 580 and 600 in the beam displacer 150; therefore, their effects are not taken into account here.

Figure 7:
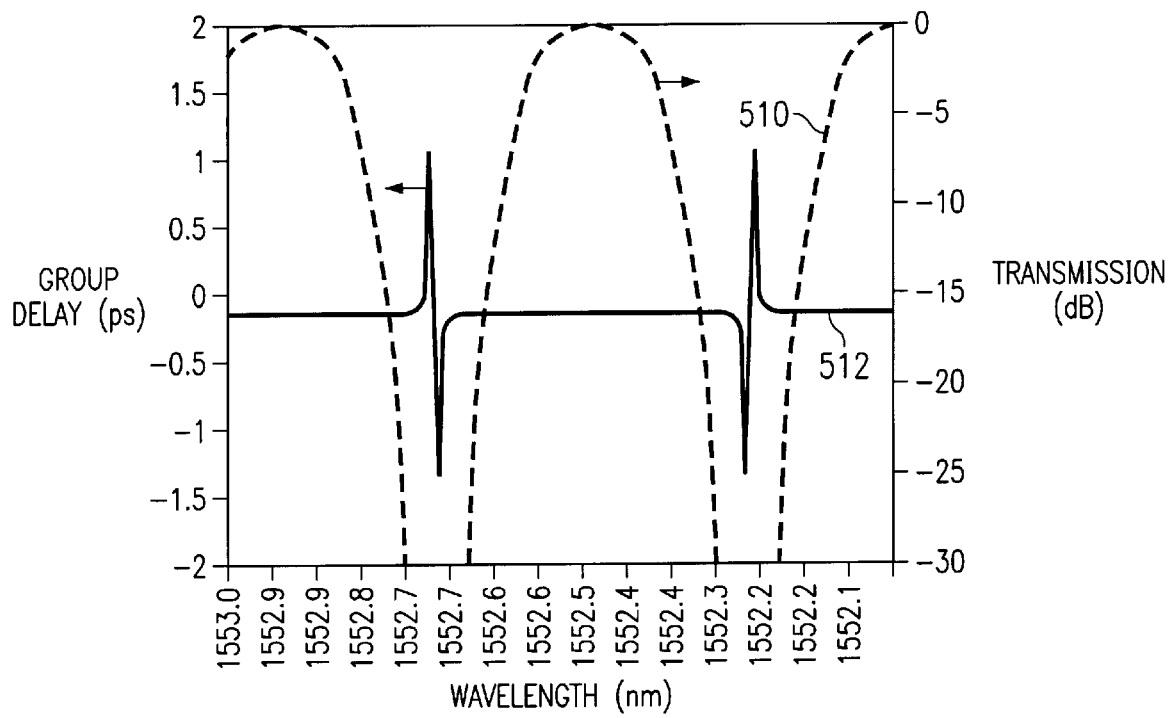
FIG. 7 is a graph illustrating simulated or modeled transmission and group delay characteristics of a first optical propagation path of FIG. 4.
Figure 8:
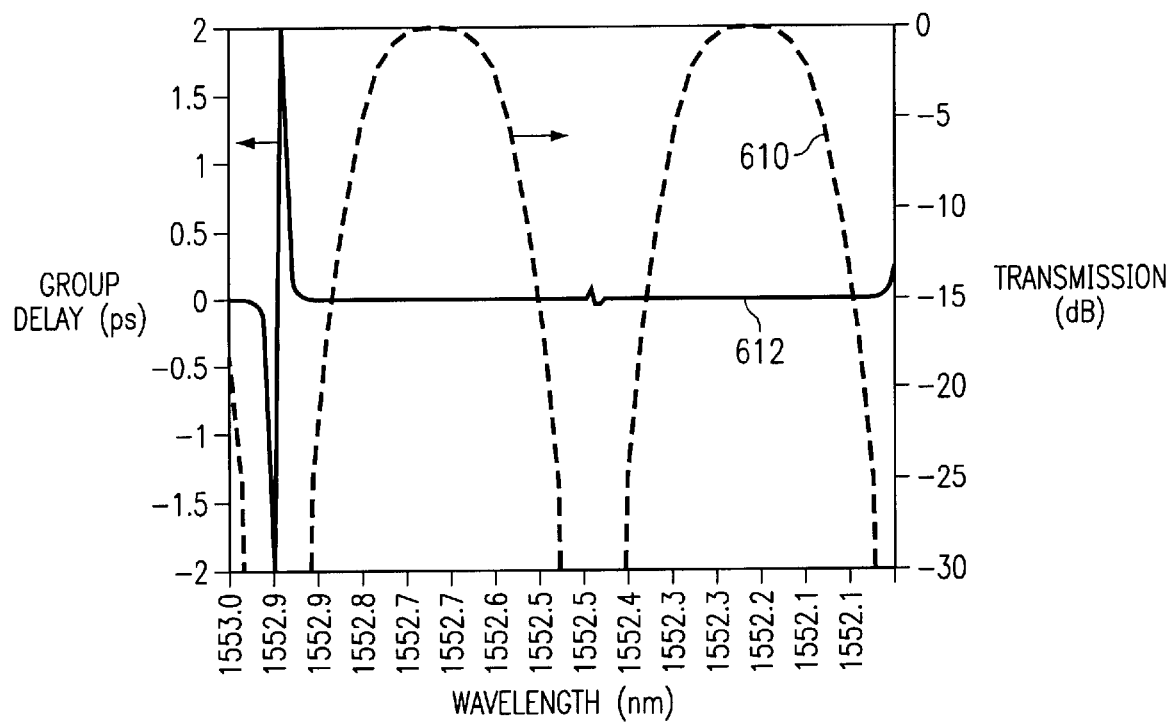
FIG. 8 is a graph illustrating simulated or modeled transmission and group delay characteristics of a second optical propagation path of FIG. 4.

FIG. 7 illustrates modeled chromatic dispersion characteristics and transmission of the first optical path 10-30-90-160-180-210 (Vertical-Vertical-Vertical-Horizontal) and FIG. 8 illustrates modeled chromatic dispersion characteristics and transmission of the second optical path 10-30-100-110-130-150 (Vertical-Horizontal-Vertical-Vertical). FIGS. 7 and 8 show transmission loss (expressed as decibels) 510, 610 and group delay 512 612 (simulated or modeled) as a function of wavelength (in nanometers). These simulation results illustrate that chromatic dispersion can be compensated significantly with the method and apparatus of the present invention. The small peaks shown in FIG. 7 and FIG. 8 are believed to be due to numerical error.

Figure 9:
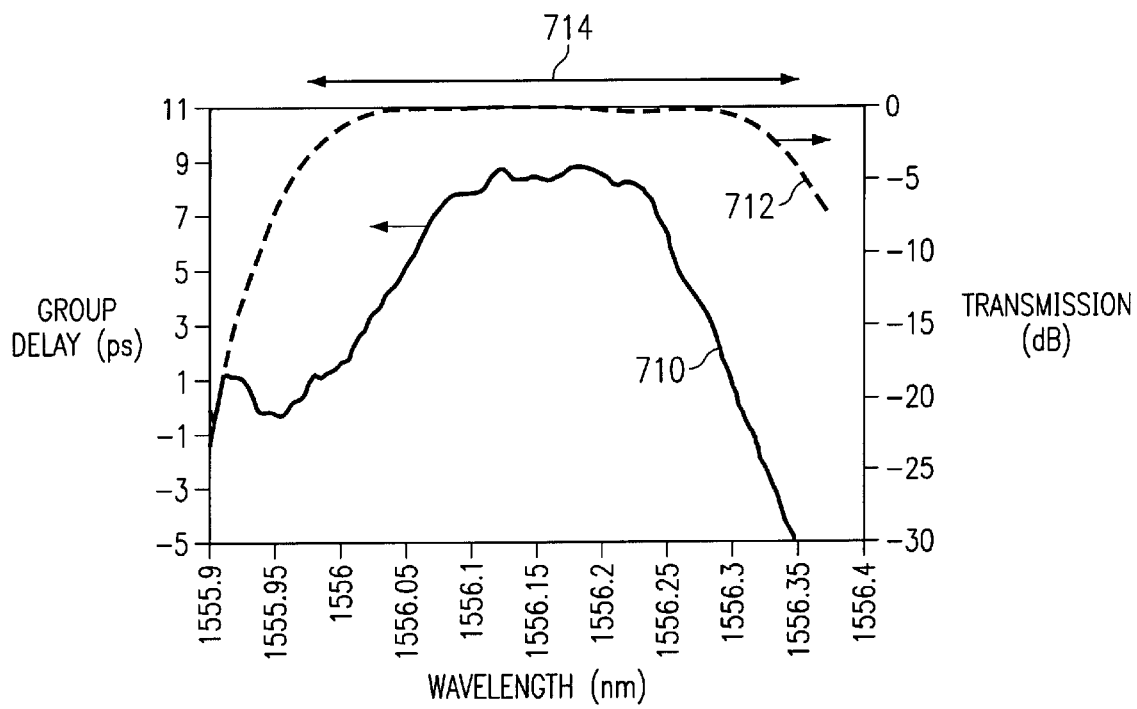
FIG. 9 is a graph depicting transmission and group delay of a stacked waveplate filter without using the present invention.
Figure 10:
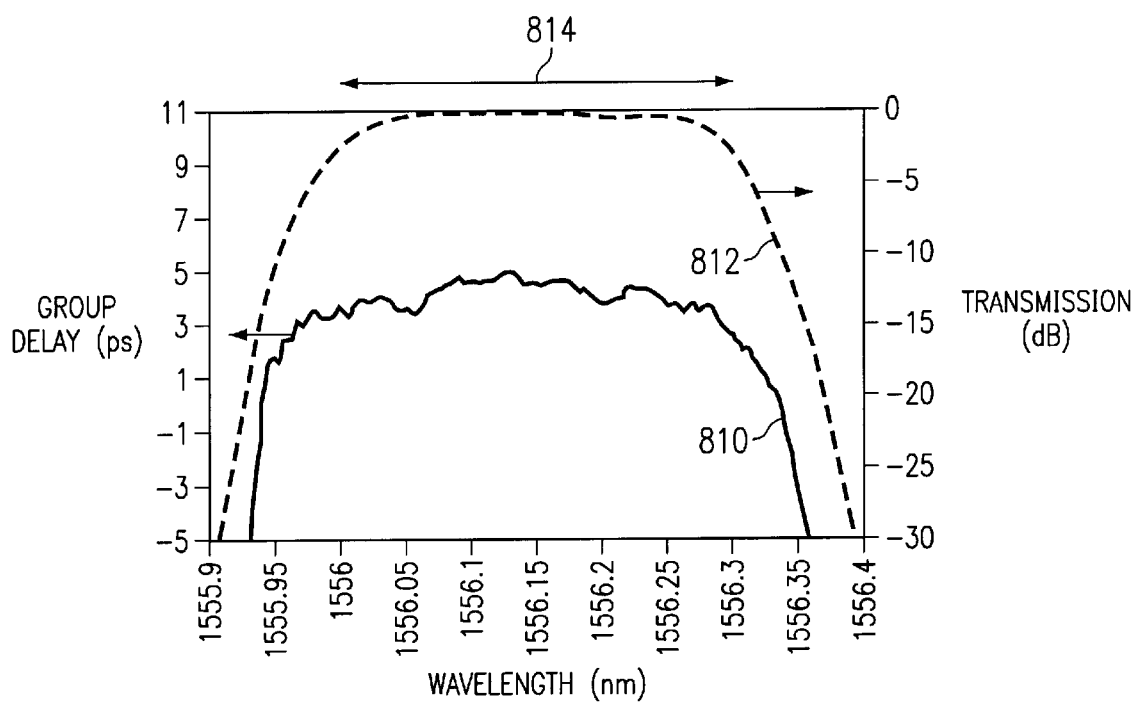
FIG. 10 is a graph depicting transmission and group delay of a stacked waveplate filter system according to an embodiment of the present invention.

FIG. 9 illustrates the relatively high amount of chromatic dispersion (group delay) 710 occurring within a transmission band 712 of a typical stacked waveplate filter such as described in U.S. Pat. No. 5,694,233 (incorporated herein by reference) in the absence of the present invention. FIG. 9 illustrates that typical previous waveplate filters were subject to relatively high dispersion such as 5 to 9 ps (or more) in at least part of the transmission band 714. In contrast, FIG. 10 illustrates that when a stacked waveplate filter apparatus is modified, e.g., as illustrated in FIG. 4, the group delay 810 within a high-transmission region 814 of the transmission curve 812 is substantially reduced (such as generally having a magnitude less than about 5 ps). The shape of the dispersion waveform which is achieved, as shown in FIG. 10, is particularly advantageous in that the dispersion is relatively flat over a relatively wide region of the passband (e.g. relatively flat from about 1555.975 nm to about 1556.3 nm, in the example of FIG. 10), in contrast to systems which provide only relatively narrow bandwidths in which the lowest (albeit possibly greater than about 5 ps) dispersion occurs.

Figure 11:
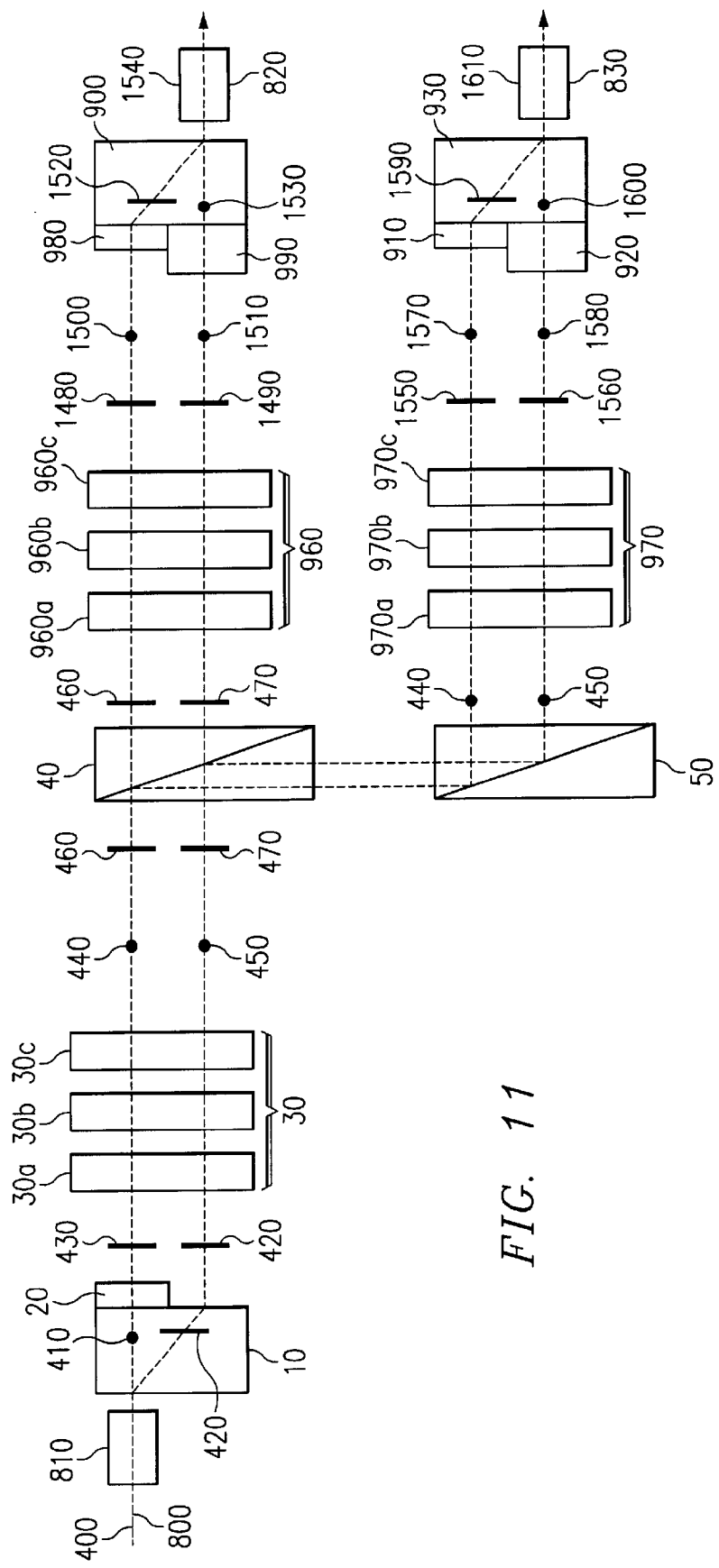
FIG. 11 is a simplified block diagram illustrating an optical system in according to an embodiment of the present invention

FIG. 11 illustrates a simplified diagram of another double stage stacked-waveplate optical system according to one embodiment of the present invention. Reference numerals in FIG. 11 which are found in FIG. 4 refer to corresponding components.

In the system illustrated in FIG. 11, an incoming signal 400 passes through an optical fiber 800 and a collimator 810 to enter the system. The input signal 400 is then decomposed into two signal components: signal 410 (with horizontal polarization) and signal 420 (with vertical polarization) by the beam displacer 10. Signal 410 is then passed through the half-waveplate 20, and its polarization is changed to vertical. The resulting signal with vertical polarization is designated as 430. Signals 420 and 430 then pass through the stacked waveplate filter 30 made up of a plurality of substantially aligned individual waveplates 30a, 30b, and 30c. As illustrated in FIG. 1, the output signals of stacked waveplate filter 30 corresponding with incoming signals 430 and 420 are two sets of two signals with orthogonal polarizations. The output signals corresponding with input signal 430 are signal 440 (with horizontal polarization) and signal 460 (with vertical polarization). The output signals corresponding with input signal 420 are signal 450 (with horizontal polarization) and signal 470 (with vertical polarization). Two polarization beamsplitters 40 and 50 are used to separate signals with different polarizations.

The signals with vertical polarization, 460 and 470 are separated from signals with horizontal polarization, 440 and 450, by the two polarization beamsplitters 40 and 50. Signals with the same polarization are spatially separated. Signal 460 and 470 are then passed through stacked waveplate filters 960 made up of a plurality of substantially aligned individual waveplates 960a, 960b, and 960c. As illustrated in FIG. 1, the output signals of stacked waveplate filter 960 corresponding with incoming signals 460 and 470 are two sets of two signals with different polarization orthogonal to each other respectively. The output signals corresponding with signal 460 are signal 1480 (with vertical polarization) and signal 1500 (with horizontal polarization). The output signals corresponding with the signal 470 are signal 1490 (with vertical polarization) and signal 1510 (with vertical polarization).

Since signals 460 and 470 have polarization which is not changed by the stacked waveplate filter 30, signal 1500 and 1510 whose polarization is changed by stack waveplate filter 960 are desired. This way, the chromatic dispersion caused by the stacked waveplate filters 30 and 960 can be compensated. To combine signals 1500 and 1510 (which have the same polarization and are spatially separated) without energy loss, the polarization of one of them needs to be changed. Signal 1500 passes through the half-waveplate 980 and, its polarization is then changed to vertical polarization. The resulting signal is then designated as signal 1520. Signal 1510 is passed through the glass 990 since there is index different between two optical paths 10-20-30-40-960 through which the signal 1500 goes and 10-30-40-960 through which the signal 1510 goes. After passing through the glass 990, the polarization of 1510 is unchanged and the resulting signal is designated as 1530. Signal 1520 (with vertical polarization) and signal 1530 (with horizontal polarization) are combined in the stacked waveplate filter 900, and the resulting signal is designated 1540. Signal 1540 is then passed through collimator 820 to enter optical fiber, systems, or network. Signals 1480 and 1490 will not interfere with signal 1500 and 1510 as demonstrated in FIG. 5. Therefore, their effects are not taken into account.

The signals with horizontal polarization, 440 and 450 are separated from signals with horizontal polarization, 460 and 470 by the two polarization beamsplitters 40 and 50. These signals have the same polarization and spatially separated. Signal 440 and 450 are then passed through stacked waveplate filters 970 made up of a plurality of substantially aligned individual waveplates 970a, 970b, and 970c. As illustrated in FIG. 1, the output signals of stacked waveplate filter 970 corresponding with incoming signals 440 and 450 are two sets of two signals with orthogonal polarizations. The output signals corresponding with signal 440 are signal 1550 (with vertical polarization) and signal 1570 (with horizontal polarization). The output signals corresponding with signal 450 are signal 1560 (with vertical polarization) and signal 1580 (with horizontal polarization). Since the polarization of signals 440 and 450 is changed by the stacked waveplate filter 30, signals 1570 and 1580 whose polarization is not changed by the stacked waveplate filter 970 are desirable. This way, the chromatic dispersion caused by the stacked waveplate filters 30 and 970 can be compensated. To combine signals 1570 and 1580 (which have the same polarization and are spatially separated) without energy loss, the polarization of one of them needs to be changed. Signal 1570 passes through the half-waveplate 910 and is changed into vertical polarization. The resulting signal is designated as signal 1590. Signal 1580 passes through the glass 920 since there is an index difference between the two optical paths (10-20-30-40-50-970 through which the signal 1570 goes and 10-30-40-50-970 through which the signal 1580 goes). After passing through the glass 920, the polarization of signal 1580 is unchanged and the resulting signal is designated as signal 1600. Signal 1590 with vertical polarization and signal 1600 with horizontal polarization are combined in beam displacer 930, and the resulting signal is designated as signal 1610. The signal 1610 is then passed through collimator 830 to enter optical fiber, systems, or network. Signals 1550 and 1560 will not interfere with signal 1570 and 1580 after entering beam displacer 930 as demonstrated in FIG. 5. Therefore, their effects are not taken into account.

Those of skill in the art will understand how to fabricate, select or provide components as described herein, including waveplates, beam displacer, polarization beam splitters, glasses and the like.

In summary, and with particular reference to FIG. 4, one embodiment of the present invention provides apparatus usable for providing reduced dispersion optical signals which includes a first device 810, 10, 20 for receiving a first optical signal 400 and outputting second and third spaced-apart optical signals 420, 430; a stacked waveplate filter device(s) 30 for receiving the second and third signals and outputting fourth and fifth spaced apart output pairs, the fourth output pair comprising sixth and seventh signals 440, 460 and eighth and ninth signals 450, 470; a second device (s) 40, 60, 90, 820, 840, 870, 160, 170 for directing the seventh and ninth signals, to a second stacked waveplate filter device(s) 180, which outputs tenth 650, 670 and eleventh 660, 680 signal pairs; third device(s) 50, 70, 80, 100, 830, 850, 860, 110, 120 for directing the sixth and eighth signals, to a third stacked waveplate filter device(s) 130, which outputs twelfth 560, 580 and thirteenth, 570, 590 signal pairs; fourth device(s) 190, 200, 210, 890 for combining a portion of each of the tenth and eleventh signal pairs to output a fourteenth signal 710; and fifth device(s) 140, 150, 880 for combining a portion of each of the twelfth and thirteenth signal pairs to output a fifteenth signal 610 ; wherein chromatic dispersion arising from the first and second stacked waveplate filter device(s) is substantially compensated and wherein chromatic dispersion arising from the first and third stacked waveplate filter device(s) is substantially compensated.

With particular reference to FIG. 11, one embodiment of the present invention provides apparatus usable for providing reduced dispersion optical signals including first device (s) 810, 10, 20 for receiving a first optical signal 400 and outputting second and third spaced-apart optical signals 420, 430; a stacked waveplate filter device(s) 30 for receiving the second and third signals and outputting fourth and fifth spaced apart output pairs, the fourth output pair comprising sixth and seventh signals 440, 460 and eighth and ninth signals 450, 470; second device(s) (40) for directing the seventh and ninth signals, to a second stacked waveplate filter device(s) (960) which outputs tenth (1480, 1500) and eleventh (1490, 1510) signal pairs; third device(s) (50) for directing the sixth and eighth signals, to a third stacked waveplate filter device(s), (970) which outputs a twelfth (1550, 1570) and thirteenth, (1560, 1580) signal pairs; fourth device(s) (980, 990, 900) for combining a portion of each of the tenth and eleventh signal pairs to output a fourteenth signal (1540); and fifth device(s) (910, 920, 930) for combining a portion of each of the twelfth and thirteenth signal pairs to output a fifteenth signal (1610); wherein chromatic dispersion arising from the first and second stacked waveplate filter device(s) is substantially compensated and wherein chromatic dispersion arising from the first and third stacked waveplate filter device(s) is substantially compensated.

With particular reference to FIG. 11, one embodiment of the present invention provides apparatus for reducing optical signal dispersion which includes device(s) 810, 10, 30, 40, 50 for receiving at least a first optical signal and outputting at least second 460, 470 and third 440, 450 optical signals, the device(s) for receiving including first optical filter device (s) 30 defining substantially periodic transmissions of the second and third optical signals, as a function of wavelength, the first optical filter device(s) imparting a first dispersion; device(s) 960, 980, 990, 900, 820 for receiving the second optical signal and outputting a fourth signal 1540, the device(s) for receiving the second optical signal comprising a second periodic optical filter 960, the second periodic optical filter imparting a second dispersion which substantially compensates the first dispersion; and device(s) 970, 910, 920, 930, 830 for receiving the third optical signal and outputting a fifth signal 1610, the device(s) for receiving the third optical signal comprising a third periodic optical filter 970, the third periodic optical filter imparting a third dispersion which substantially compensates the first dispersion.

In light of the above description, a number of advantages of the present invention can be seen. The present invention can achieve a substantial reduction in dispersion along an optical path. Preferably, the present invention provides for a reduction in dispersion of a discrete optical device such as a stacked waveplate filter, compared to the amount of dispersion which would occur in a typical stacked waveplate or similar device in the absence of using the present invention. The present invention can achieve such reduction in dispersion while providing the desired types of output (typically, output of two orthogonal polarized paths) and preferably can provide such reduction in dispersion using a combination of, and/or pathway through components, each one of which is typically readily available, including providing a pathway through a sequential plurality of stacked waveplate devices with appropriate polarization change or control. Accordingly, the present invention is able to achieve reduction in dispersion at relatively low cost.

A number of variations and modifications of the present invention can be used. Although the present invention can be embodied in an optical router, it is possible to use configurations of the present invention and other types of devices such as switches, hubs, bridges, multiplexers, demultiplexers and the like. Although the present invention is believed to be particularly useful in the context of WDM signals, it is also possible to implement the present invention for use with other types of signals including unmultiplexed signals. Although the present invention was illustrated in connection with particular polarization sequences (i.e. Vertical-Vertical-Vertical-Horizontal; Vertical-Horizontal-Vertical-Vertical) other polarization sequences can also be used.

The present invention, in various embodiments, includes components, methods, processes, systems and/or apparatus substantially as depicted and described herein, including various embodiments, subcombinations, and subsets thereof. Those of skills in the art will understand how to make and use the present invention after understanding the present disclosure. The present invention, in various embodiments, includes providing devices and processes in the absence of items not depicted and/or described herein or in various embodiment hereof, including in the absence of such items as may have been used in previous devices or processes, e.g. for improving performance, achieving ease and/or reducing cost of implementation. The present invention includes items which are novel, and terminology adapted from previous and/or analogous technologies, for convenience in describing novel items or processes, do not necessarily retain all aspects of conventional usage of such terminology.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. Apparatus for reducing optical signal dispersion comprising:

first optical filter means for receiving at least a first optical signal and decomposing said at least a first optical signal into at least a second optical signal and a third optical signal, said first optical filter means imparting a first dispersion upon the second optical signal; and second optical filter means for receiving said second optical signal and decomposing said at least a second optical signal into at least a fourth optical signal, said second optical filter means imparting a second dispersion upon the fourth optical signal;

wherein said second dispersion and said first dispersion are approximately equal in magnitude and opposite in sign.

2. Apparatus for reducing optical signal dispersion comprising:

means for receiving at least a first optical signal and outputting at least second and third optical signals, said means for receiving comprising a first optical filter defining at least substantially periodic transmissions of said second and third optical signals as a function of wavelength, said first optical filter imparting a first dispersion upon the second optical signal and a second dispersion upon the third optical signal;

means for receiving said second optical signal and outputting a fourth optical signal, said means for receiving said second optical signal comprising a second optical filter, said second optical filter imparting a third dispersion which substantially compensates said first dispersion; and means for receiving said third optical signal and outputting a fifth optical signal, said means for receiving said third optical signal comprising a third optical filter, said third optical filter imparting a fourth dispersion which substantially compensates said second dispersion.

3. Apparatus as claimed in claim 2 wherein each of said fourth and fifth signals has a dispersion less than about 5 ps.

4. Apparatus as claimed in claim 2 wherein:

said third dispersion and said first dispersion are approximately equal in magnitude and opposite in sign; and said fourth dispersion and said second dispersion are approximately equal in magnitude and opposite in sign.

5. Apparatus as claimed in claim 2 wherein:

said first optical signal comprises a wavelength division multiplexed signal;

said second optical signal carries a first spectral band; and said third optical signal carries a second spectral band complementary to the first spectral band.

6. Apparatus usable for providing reduced dispersion optical signals comprising:

a first stacked waveplate filter for receiving a first optical signal and outputting second and third optical signals having substantially orthogonal polarizations;

a second stacked waveplate filter for receiving said second output signal and outputting a fourth signal;

a polarization rotator for receiving said third signal and outputting a fifth signal having a polarization transverse to a polarization of said third signal;

a third stacked waveplate device for receiving said fifth signal and outputting a sixth signal wherein said fourth signal and said sixth signal have substantially opposite polarizations; and wherein dispersion of said second signal is substantially compensated by dispersion provided in said second stacked waveplate device and dispersion in said third signal is substantially compensated by dispersion provided in said third stacked waveplate device.

7. Apparatus, as claimed in claim 6, further comprising a receiver for receiving said fourth and sixth signals and combining said fourth and sixth signals to provide a seventh signal, said seventh signal having a transmission which defines a plurality of substantially periodic 90% transmission regions, as a function of wavelength, and wherein dispersion of said seventh signal has a magnitude, in at least one of said 90% transmission regions, of less than about 5 ps.

8. Apparatus, as claimed in claim 6, wherein each of said waveplates of said first second and third stacked waveplate devices comprises at least one birefringent crystal.

9. A method for reducing optical signal dispersion comprising:

passing a first signal through a first stacked waveplate device to provide at least a second signal, with at least a substantially periodic wavelength spectrum and having a first dispersion;

passing said second signal through a second stacked waveplate device providing a third signal having a second dispersion;

wherein said second dispersion and said first dispersion are approximately equal in magnitude and opposite in sign.

10. A method, as claimed in claim 9, wherein said first stacked waveplate device outputs a fourth signal having a wavelength spectrum complementary to the wavelength spectrum of the second signal and having a third dispersion, the method further comprising:

providing said fourth signal to a third stacked waveplate device to output a fifth signal having a fourth dispersion; and wherein the fourth dispersion and the third dispersion are substantially equal in magnitude and opposite in sign.

11. Apparatus for reducing optical signal dispersion comprising:

first stacked waveplate means for receiving a first optical signal and outputting second and third optical signals, with orthogonal polarizations and having first and second dispersions;

second and third stacked waveplate means for receiving said second and third optical signals and outputting fourth and fifth signals, respectively, wherein said second and third stacked waveplate means impart third and fourth dispersions substantially equal in magnitude but opposite in sign to said first and second dispersions, respectively.

12. Apparatus usable for providing reduced dispersion optical signals comprising:

first means for receiving a first optical signal and outputting second and third spaced-apart optical signals;

stacked waveplate filter means for receiving said second and third signals and outputting fourth and fifth spaced apart output pairs, said fourth output pair comprising sixth and seventh signals and said fifth output pair comprising eighth and ninth signals;

second means for directing said seventh and ninth signals to a second stacked waveplate filter means which outputs a tenth signal pair and an eleventh signal pair;

third means for directing said sixth and eighth signals to a third stacked waveplate filter means which outputs a twelfth signal pair and a thirteenth signal pair;

fourth means for combining a portion of said tenth signal pair with a portion of said eleventh signal pair to output a fourteenth signal;

fifth means for combining a portion of said twelfth signal pair with a portion of said thirteenth signal pair to output a fifteenth signal;

wherein chromatic dispersion arising from said first and second stacked waveplate filter means is substantially compensated and wherein chromatic dispersion arising from said first and third stacked waveplate filter means is substantially compensated.

13. Apparatus, as claimed in claim 12, wherein said second and third signals have the same polarization.

14. Apparatus, as claimed in claim 12, wherein said sixth and seventh signals have transverse polarizations and said eighth and ninth signals have transverse polarizations.

15. Apparatus, as claimed in claim 12, wherein said seventh and ninth signals have the same polarization and said sixth and eighth signals have the same polarization.

16. Apparatus, as claimed in claim 12, further comprising a polarization rotator operable to rotate the polarization of at least one of the portion of the tenth signal pair and the portion of the eleventh signal pair before said portions are combined.

17. Apparatus, as claimed in claim 12, further comprising a polarization rotator operable to rotate the polarization of at least one of the portion of the twelfth signal pair and the portion of the thirteenth signal pair before said portions are combined.

18. Apparatus, as claimed in claim 12, wherein said first means comprises a beam displacer and a half-wave plate.

19. Apparatus, as claimed in claim 12, wherein each of said second and third means comprises a polarization beam splitter.

20. Apparatus, as claimed in claim 12, wherein each of said second and third means comprises:

a polarization beam splitter;

a first half-waveplate;

first and second beam displacer; and a second half waveplate.

21. Apparatus, as claimed in claim 12 wherein each of said fourth and fifth means comprises a half waveplate and a beam displacer.

22. Apparatus, as claimed in claim 12, further comprising means for assuring that said portion of said tenth signal pair and said portion of said eleventh signal pair have substantially equal effective path lengths before said portions are combined.

23. Apparatus, as claimed in claim 12, further comprising means for assuring that said portion of said twelfth signal pair and said portion of said thirteenth signal pair have substantially equal effective path lengths before said portions are combined.

24. Apparatus, as claimed in claim 23, wherein said means for assuring comprises glass.

25. Apparatus, as claimed in claim 12 wherein at least one of said stacked waveplate filter means provides thermal compensation.

26. The apparatus of claim 1, wherein the first optical filter means is further for imparting a third dispersion upon the third optical signal, the apparatus further comprising a third optical filter means for receiving said third optical signal and decomposing said third optical signal into at least a fifth optical signal, said third optical filter means imparting a fourth dispersion upon said fifth optical signal, wherein said third dispersion and said fourth dispersion are approximately equal in magnitude and opposite in sign.

27. The apparatus of claim 1, wherein:

the first optical signal comprises a wavelength division multiplexed signal;

the second optical signal carries a first spectral band; and the third optical signal carries a second spectral band complementary to the first spectral band.

28. The apparatus of claim 27, wherein:

the second optical signal has a first polarization; and the third optical signal has a second polarization transverse to the first polarization.

29. The apparatus of claim 28, further comprising a routing element operable to spatially route the second and third optical signals based on their polarizations.

30. The apparatus of claim 26, wherein the first and third dispersions are approximately equal in magnitude and opposite in sign.

31. The apparatus of claim 1, wherein the fourth optical signal has a dispersion less than 5 ps.

32. A method for dispersion compensation, comprising:

decomposing at least a first optical signal into at least a second optical signal and a third optical signal using at least a first optical filter, said at least a first optical filter imparting at least a first dispersion upon the second optical signal; and decomposing said at least a second optical signal into at least a fourth optical signal using at least a second optical filter, said at least a second optical filter imparting a second dispersion upon the fourth optical signal, wherein said second dispersion and said first dispersion are at least approximately equal in magnitude and opposite in sign.

33. The method of claim 32, wherein the first optical filter imparts a third dispersion upon the third optical signal and further comprising decomposing the third optical signal into at least a fifth optical signal using a third optical filter, wherein the third optical filter imparts a fourth dispersion upon the fifth optical signal and wherein the third dispersion and the fourth dispersion are approximately equal in magnitude and opposite in sign.

34. The method of claim 32, wherein:
the first optical signal comprises a wavelength division multiplexed signal;
the second optical signal carries a first spectral band; and
the third optical signal carries a second spectral band complementary to the first spectral band.

35. The method of claim 34, wherein:
the second optical signal has a first polarization; and
the third optical signal has a second polarization transverse to the first polarization.

36. The method of claim 35, further comprising a routing element operable to spatially route the second and third optical signals based on their polarizations.

37. The method of claim 33, wherein the first and third dispersions are approximately equal in magnitude and opposite in sign.

38. The method of claim 32, wherein the fourth optical signal has a dispersion less than 5 ps.

39. A dispersion compensation apparatus, comprising:
a first optical filter operable to receive at least a first optical signal and to decompose the first optical signal into at least a second optical signal and a third optical signal, wherein the first optical filter imparts a first dispersion upon the second optical signal; and
a second optical filter operable to decompose the second optical signal into at least a fourth optical signal, wherein the second optical filter imparts a second dispersion upon the fourth optical signal;
wherein the second dispersion and the first dispersion are at least approximately equal in magnitude and opposite in sign.

40. The apparatus of claim 39, wherein the first optical filter imparts a third dispersion upon the third optical signal, the apparatus further comprising a third optical filter operable to decompose the third optical signal into at least a fifth optical signal, wherein the third optical filter imparts a fourth dispersion upon the fifth optical signal, wherein said third dispersion and said fourth dispersion are approximately equal in magnitude and opposite in sign.

41. The apparatus of claim 39, wherein:
the first optical signal comprises a wavelength division multiplexed signal;
the second optical signal carries a first spectral band; and
the third optical signal carries a second spectral band complementary to the first spectral band.

42. The apparatus of claim 41, wherein:
the second optical signal has a first polarization; and
the third optical signal has a second polarization transverse to the first polarization.

43. The apparatus of claim 42, further comprising a routing element operable to spatially route the second and third optical signals based on their polarizations.

44. The apparatus of claim 40, wherein the first and third dispersions are approximately equal in magnitude and opposite in sign.

45. The apparatus of claim 39, wherein the fourth optical signal has a dispersion less than 5 ps.

46. A dispersion compensation apparatus, comprising:
a first optical filter that receives at least a first optical signal and outputs at least a second optical signal imparted with a first dispersion and a third optical signal imparted with a second dispersion, wherein the first optical signal comprises a plurality of wavelengths, the second optical signal comprises a first subset of the plurality of wavelengths and the third optical signal comprises a second subset of the plurality of wavelengths that is complementary to the first subset;
a second optical filter operable to receive the second optical signal and to output at least a fourth optical signal, wherein the second optical filter imparts a third dispersion which substantially compensates the first dispersion; and
a third optical filter operable to receive the third optical signal and to output at least a fifth optical signal, wherein the third optical filter imparts a fourth dispersion which substantially compensates the second dispersion.

47. The apparatus of claim 46, wherein:
the third dispersion and the first dispersion are approximately equal in magnitude and opposite in sign; and
the fourth dispersion and the second dispersion are approximately equal in magnitude and opposite in sign.

48. The apparatus of claim 46, wherein:
the second optical signal has a first polarization; and
the third optical signal has a second polarization transverse to the first polarization.

49. The apparatus of claim 48, further comprising a routing element operable to spatially route the second and third optical signals based upon their polarizations.

50. The apparatus of claim 46, wherein at least one of the fourth optical signal and the fifth optical signal has a dispersion less than 5 ps.

51. The apparatus of claim 11, wherein:
the first optical signal comprises a wavelength division multiplexed signal;
the second optical signal carries a first spectral band; and
the third optical signal carries a second spectral band complementary to the first spectral band.

52. The apparatus of claim 51, further comprising a routing element operable to spatially route the second and third optical signals based on their polarizations.

53. The apparatus of claim 11, wherein at least one of the fourth optical signal and the fifth optical signal has a dispersion less than 5 ps.

54. The method of claim 9, wherein:
the first optical signal comprises a plurality of wavelengths;
the wavelength spectrum of the second optical signal comprises a first subset of the plurality of wavelengths associated with the first optical signal;
the wavelength spectrum of the fourth optical signal comprises a second subset of the plurality of wavelengths associated with the first optical signal.

55. The method of claim 10, wherein:
the second optical signal has a first polarization; and
the fourth optical signal has a second polarization transverse to the first polarization.

56. The method of claim 55, further comprising routing the second and fourth optical signals based upon their polarizations.

57. A dispersion compensation apparatus, comprising:
a first optical filter operable to:
receive first and second optical signals, each signal having a first polarization;

process the first optical signal into at least a third optical signal having the first polarization; and process the second optical signal into at least a fourth optical signal having the first polarization;

a second optical filter operable to:
  receive the third and fourth optical signals;
  process the third optical signal into fifth and sixth optical signals, wherein the fifth optical signal has the first polarization and the sixth optical signal has a second polarization orthogonal to the first polarization;
  process the fourth optical signal into seventh and eighth optical signals, wherein the seventh optical signal has the first polarization and the eighth optical signal has the second polarization;

a polarization rotator operable to rotate the polarization of the sixth optical signal such that the sixth optical signal has the first polarization; and a combining element operable to combine the sixth optical signal having the first polarization with the eighth optical signal having the second polarization to form a ninth optical signal such that dispersion imparted by the second optical filter compensates for dispersion imparted by the first optical filter.

58. The apparatus of claim 57, wherein the first optical filter is further operable to process the first optical signal into a tenth optical signal having the second polarization, and to process the second optical signal into an eleventh optical signal having the second polarization, the dispersion compensation apparatus further comprising:

a third optical filter operable to:
  receive the tenth and eleventh optical signals;
  process the tenth optical signal into twelfth and thirteenth optical signals, wherein the twelfth optical signal has the first polarization and the thirteenth optical signal has the second polarization signal; and
  process the eleventh optical signal into fourteenth and fifteenth optical signals, wherein the fourteenth optical signal has the first polarization and the fifteenth optical signal has the second polarization;

a second polarization rotator operable to rotate the polarization of the fourteenth optical signal such that it has the second polarization; and a second combining element operable to combine the fourteenth optical signal having the second polarization with the twelfth optical signal having the first polarization such that dispersion imparted by the third optical filter compensates for dispersion imparted by the first optical filter.

59. The apparatus of claim 57, wherein the first optical filter comprises a plurality of stacked waveplates.

60. The apparatus of claim 58, wherein:
the first optical signal and the second optical signal each comprise wavelength division multiplexed optical signals;
the third and fourth optical signals carry a first spectral band; and
the tenth and eleventh optical signals carry a second spectral band complementary to the first spectral band.

61. The apparatus of claim 58, further comprising a routing element operable to spatially route the third, fourth, tenth, and eleventh optical signals based upon their polarizations.

62. The apparatus of claim 57, further comprising a transmissive element placed in the optical path of at least one of the sixth and eighth optical signals such that the effective path length of the sixth optical signal is substantially the same as the effective path length of the eighth optical signal.

63. The apparatus of claim 62, wherein the transmissive element comprises glass.

64. The apparatus of claim 57, wherein:
the first optical filter imparts a first dispersion upon the third and fourth optical signals; and
the second optical filter imparts a second dispersion upon the sixth and eighth optical signals such that the second dispersion and the first dispersion are approximately equal in magnitude and opposite in sign.

65. The apparatus of claim 58, wherein:
the first optical filter imparts a first dispersion upon the third and fourth optical signals and a second dispersion upon the tenth and eleventh optical signals;
the second optical filter imparts a third dispersion upon the sixth and eighth optical signals such that the second dispersion and the first dispersion are approximately equal in magnitude and opposite in sign; and
the third optical filter imparts a fourth dispersion upon the twelfth and fourteenth optical signals such that the fourth dispersion and the second dispersion are approximately equal in magnitude and opposite in sign.

66. The apparatus of claim 57, wherein the ninth optical signal has a dispersion less than 5 ps.

67. A method for dispersion compensation, comprising:
receiving first and second optical signals, each signal having a first polarization;
processing the first optical signal into at least a third optical signal having the first polarization;
processing the second optical signal into at least a fourth optical signal having the first polarization;
receiving the third and fourth optical signals;
processing the third optical signal into fifth and sixth optical signals, wherein the fifth optical signal has the first polarization and the sixth optical signal has a second polarization orthogonal to the first polarization;
processing the fourth optical signal into seventh and eighth optical signals, wherein the seventh optical signal has the first polarization and the eighth optical signal has the second polarization;
rotating the polarization of the sixth optical signal such that the sixth optical signal has the first polarization; and
combining the sixth optical signal having the first polarization with the eighth optical signal having the second polarization to form a ninth optical signal such that dispersion imparted by processing the third and fourth optical signals compensates for dispersion imparted by processing the first and second optical signals.

68. The method of claim 67, wherein:
the steps of processing the first and second optical signals are performed using a first optical filter; and
the steps of processing the third and fourth optical signals are performed using a second optical filter.

69. The method of claim 67, further comprising:
processing the first optical signal into a tenth optical signal having the second polarization;
processing the second optical signal into an eleventh optical signal having the second polarization;
processing the tenth optical signal into twelfth and thirteenth optical signals, wherein the twelfth optical signal has the first polarization and the thirteenth optical signal has the second optical signal;

processing the eleventh optical signal into fourteenth and fifteenth optical signals, wherein the fourteenth optical signal has the first polarization and the fifteenth optical signal has the second optical signal;

rotating the polarization of the fourteenth optical signal such that the fourteenth signal has the second polarization; and combining the fourteenth optical signal having the second polarization with the twelfth optical signal having the first polarization such that dispersion imparted by processing the tenth and eleventh optical signals compensates for dispersion imparted by processing the first and second optical signals.

70. The method of claim 69, wherein:

the steps of processing the first and second optical signals are performed using a first optical filter;

the steps of processing the third and fourth optical signals are performed using a second optical filter; and the steps of processing the tenth and eleventh optical signals are performed using a third optical filter.

71. The method of claim 68, wherein the first optical filter comprises a plurality of stacked waveplates.

72. The method of claim 70, wherein:

the first optical signal and the second optical signal each comprise wavelength division multiplexed optical signals;

the third and fourth optical signals carry a first spectral band; and the tenth and eleventh optical signals carry a second spectral band complementary to the first spectral band.

73. The method of claim 70, further comprising routing the third, fourth, tenth, and eleventh optical signals based upon their polarizations.

74. The method of claim 68, wherein:

the first optical filter imparts a first dispersion upon the third and fourth optical signals; and the second optical filter imparts a second dispersion upon the sixth and eighth optical signals such that the second dispersion and the first dispersion are approximately equal in magnitude and opposite in sign.

75. The method of claim 70, wherein:

the first optical filter imparts a first dispersion upon the third and fourth optical signals and a second dispersion upon the tenth and eleventh optical signals;

the second optical filter imparts a third dispersion upon the sixth and eighth optical signals such that the second dispersion and the first dispersion are approximately equal in magnitude and opposite in sign; and the third optical filter imparts a fourth dispersion upon the twelfth and fourteenth optical signals such that the fourth dispersion and the second dispersion are approximately equal in magnitude and opposite in sign.

76. The method of claim 67, wherein the ninth optical signal has a dispersion less than 5 ps.

* * * * *